US006865540B1

(12) United States Patent
Faber et al.

(10) Patent No.: US 6,865,540 B1
(45) Date of Patent: Mar. 8, 2005

(54) METHOD AND APPARATUS FOR PROVIDING GROUP CALLS VIA THE INTERNET

(75) Inventors: Scott Faber, San Francisco, CA (US); Sean Van der Linden, San Francisco, CA (US)

(73) Assignee: Ingenio, Inc., San Francisco, CA (US)

( * ) Notice: Subject to any disclaimer, the term of this patent is extended or adjusted under 35 U.S.C. 154(b) by 368 days.

(21) Appl. No.: 09/635,506

(22) Filed: Aug. 9, 2000

(51) Int. Cl.[7] .............................................. G06F 17/60
(52) U.S. Cl. .......................................... 705/8; 705/26
(58) Field of Search ............................. 705/1, 7–9, 26; 379/265.1, 265.11, 265.12, 265.13, 265.14, 266.06

(56) References Cited

U.S. PATENT DOCUMENTS

| 4,577,065 | A | 3/1986 | Frey et al. |
| 4,631,428 | A | 12/1986 | Grimes |
| 4,677,434 | A | 6/1987 | Fascenda |

(List continued on next page.)

FOREIGN PATENT DOCUMENTS

| GB | 2329046 A | 10/1999 |
| JP | 409233441 A | 9/1997 |
| JP | 409319812 A | 12/1997 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |

OTHER PUBLICATIONS

Michael Kanellos, "Do You Want To Know The Meaning of Life?", Computer Reseller News, Mar. 3, 1997, pp. 72–74.
"Applying Technology News", Accounting Technology, Feb./Mar. 1997, p. 14.
Ellen Greenblatt, "Have you ever wonder. . . ", Datamation, Oct. 1997, p. 126.
"Information for sale: Commerical Digital Reference and AskA Services", Virtual Reference Desk, Sep. 20, 1999, at www.vrd.org/AskA/commAskA.html.
EXP.com Web Site at www.exp.com/.
The Web Site at www.experts–exchange,com/.
Electronic Emissary at www.tapr.org/emissary/.
The Web Site at www.allexperts.com/.

(List continued on next page.)

Primary Examiner—Susanna M. Diaz
(74) Attorney, Agent, or Firm—Blakely Sokoloff Taylor Zafman LLP

(57) ABSTRACT

Method and apparatus for implementing group calling are disclosed. In one embodiment, the method includes displaying a service provider, a service provider rate for communicating with the service provider, and a real-time indication of whether the service provider is available. The method may further include receiving a request from a first customer to communicate with the service provider and connecting the first customer to the service provider through a link capable of transmitting from the service provider to the first customer. The method may also further include receiving a request from a second customer to communicate with the service provider and connecting the second customer to the service provider through a link capable of transmitting from the service provider to the second customer while the first customer is coupled to the service provider.

96 Claims, 14 Drawing Sheets

U.S. PATENT DOCUMENTS

| | | | |
|---|---|---|---|
| 4,723,283 A | 2/1988 | Nagasawa et al. | |
| 4,751,669 A | 6/1988 | Sturgis et al. | |
| 4,847,890 A | 7/1989 | Solomon et al. | |
| 5,058,152 A | 10/1991 | Solomon et al. | |
| 5,148,474 A | 9/1992 | Haralambopoulos et al. | |
| 5,319,542 A | 6/1994 | King, Jr. et al. | |
| 5,325,424 A | 6/1994 | Grube | |
| 5,347,632 A | 9/1994 | Filepp et al. | |
| 5,359,508 A | 10/1994 | Rossides | |
| 5,361,295 A | 11/1994 | Solomon et al. | |
| 5,369,694 A | 11/1994 | Bales et al. | |
| 5,453,352 A | 9/1995 | Tachibana | |
| 5,497,502 A | 3/1996 | Castille | |
| 5,537,314 A | 7/1996 | Kanter | |
| 5,539,735 A | 7/1996 | Moskowitz | |
| 5,555,298 A | 9/1996 | Jonsson | |
| 5,557,677 A | 9/1996 | Prytz | |
| 5,590,197 A | 12/1996 | Chen et al. | |
| 5,602,905 A | 2/1997 | Mettke | |
| 5,608,786 A | 3/1997 | Gordon | |
| 5,619,570 A | 4/1997 | Tsutsui | |
| 5,619,725 A | 4/1997 | Gordon | |
| 5,619,991 A | 4/1997 | Sloane | |
| 5,634,012 A | 5/1997 | Stefik et al. | |
| 5,638,432 A | 6/1997 | Wille et al. | |
| 5,675,734 A | 10/1997 | Hair | |
| 5,694,549 A | 12/1997 | Carlin et al. | |
| 5,710,887 A | 1/1998 | Chelliah et al. | |
| 5,712,979 A | 1/1998 | Graber et al. | |
| 5,715,314 A | 2/1998 | Payne et al. | |
| 5,717,860 A | 2/1998 | Graber et al. | |
| 5,718,247 A | 2/1998 | Frankel | |
| 5,721,763 A | 2/1998 | Joseph et al. | |
| 5,722,418 A | 3/1998 | Bro | |
| 5,724,424 A | 3/1998 | Gifford | |
| 5,734,961 A | 3/1998 | Castille | |
| 5,740,231 A | 4/1998 | Cohn et al. | |
| 5,745,681 A | 4/1998 | Levine et al. | |
| 5,768,348 A | 6/1998 | Solomon et al. | |
| 5,768,521 A | 6/1998 | Dedrick | |
| 5,778,367 A | 7/1998 | Wesinger, Jr. et al. | |
| 5,794,221 A | 8/1998 | Egendorf | |
| 5,809,119 A | 9/1998 | Tonomura et al. | |
| 5,809,145 A | 9/1998 | Slik et al. | |
| 5,812,769 A | 9/1998 | Graber et al. | |
| 5,818,836 A | 10/1998 | DuVal | |
| 5,819,092 A | 10/1998 | Ferguson et al. | |
| 5,819,267 A | 10/1998 | Uyama | |
| 5,819,271 A | 10/1998 | Mahoney et al. | |
| 5,819,285 A | 10/1998 | Damico et al. | |
| 5,825,869 A | 10/1998 | Brooks et al. | |
| 5,825,876 A | 10/1998 | Peterson, Jr. | |
| 5,832,523 A | 11/1998 | Kanai et al. | |
| 5,835,896 A | 11/1998 | Fisher et al. | |
| 5,842,212 A | 11/1998 | Ballurio et al. | |
| 5,850,433 A | 12/1998 | Rondeau | |
| 5,860,068 A | 1/1999 | Cook | |
| 5,862,223 A | 1/1999 | Walker et al. | |
| 5,864,871 A | 1/1999 | Kitain et al. | |
| 5,870,744 A | 2/1999 | Sprague | |
| 5,878,130 A | 3/1999 | Andrews et al. | |
| 5,884,032 A | 3/1999 | Bateman et al. | |
| 5,884,272 A | 3/1999 | Walker et al. | |
| 5,884,282 A | 3/1999 | Robinson | |
| 5,889,774 A | 3/1999 | Mirashrafi et al. | |
| 5,890,138 A | 3/1999 | Godin et al. | |
| 5,893,077 A | 4/1999 | Griffin | |
| 5,907,677 A | 5/1999 | Glenn et al. | |
| 5,911,132 A | 6/1999 | Sloane | |
| 5,914,951 A | 6/1999 | Bentley et al. | |
| 5,924,082 A | 7/1999 | Silverman et al. | |
| 5,940,471 A | 8/1999 | Homayoun | |
| 5,974,141 A | 10/1999 | Saito | |
| 5,982,863 A | 11/1999 | Smiley et al. | |
| 5,987,102 A | 11/1999 | Elliott et al. | |
| 5,987,430 A | 11/1999 | Van Horne et al. | |
| 5,991,394 A | 11/1999 | Dezonno et al. | |
| 5,999,609 A | 12/1999 | Nishimura | |
| 6,011,794 A | 1/2000 | Mordowitz et al. | |
| 6,014,644 A | 1/2000 | Erickson | |
| 6,026,087 A | 2/2000 | Mirashrafi et al. | |
| 6,026,148 A | 2/2000 | Dworkin et al. | |
| 6,026,400 A | 2/2000 | Suzuki | |
| 6,029,141 A | 2/2000 | Bezos et al. | |
| 6,035,021 A | 3/2000 | Katz | |
| 6,046,762 A | 4/2000 | Sonesh et al. | |
| 6,055,513 A | 4/2000 | Katz et al. | |
| 6,058,379 A | 5/2000 | Odom et al. | |
| 6,064,978 A | 5/2000 | Gardner et al. | |
| 6,130,933 A | 10/2000 | Miloslavsky | |
| 6,144,670 A | 11/2000 | Sponaugle et al. | |
| 6,175,619 B1 | 1/2001 | DeSimone | |
| 6,185,194 B1 | 2/2001 | Musk et al. | |
| 6,188,673 B1 | 2/2001 | Bauer et al. | |
| 6,192,050 B1 | 2/2001 | Stovall | |
| 6,199,096 B1 | 3/2001 | Mirashrafi et al. | |
| 6,212,192 B1 | 4/2001 | Mirashrafi et al. | |
| 6,223,165 B1 * | 4/2001 | Lauffer | 705/8 |
| 6,259,774 B1 | 7/2001 | Miloslavsky et al | |
| 6,298,056 B1 | 10/2001 | Pendse | |
| 6,304,637 B1 | 10/2001 | Mirashrafi et al. | |
| 6,310,941 B1 | 10/2001 | Crutcher et al. | |
| 6,393,412 B1 * | 5/2002 | Deep | 705/400 |
| 6,404,864 B1 | 6/2002 | Evslin et al. | |
| 6,523,010 B2 * | 2/2003 | Lauffer | 705/8 |
| 6,546,372 B2 * | 4/2003 | Lauffer | 705/8 |
| 6,549,889 B2 * | 4/2003 | Lauffer | 705/8 |
| 2001/0026609 A1 * | 10/2001 | Weinstein et al. | 379/93.01 |

OTHER PUBLICATIONS

Kiyoshi Kabeya, Akihiro Tomishisa and Sueharu Miyahara, "A New Teleconsultation Terminal System Using ISDN," NTT Review, vol. 3, No. 4, Jul. 1991, pp. 37–43.

"USA Global Link Brings Interactively to Internet Shopping", Business Wire., 10/98.

"Lucent Technology and Netscape Team to Deliver Lucent Ecommerce Solutions", Business Wire, 9/98.

"TriNet's, Help Me, I'm Stuck, Internet Voice Button Services Pushes Web Pages to Online Users", Business Wire, 3/98.

Tehrani, Rich, "e–Rip Van Winkle and the 60 second Nap", Call Center Solution, vol. 18, No. 2, pp. 16(3)., 8/99.

"Netcall Internet Call Buttons Enhance E–Commerce Customer Service and Sales", PR Newswire, p. 7431., 8/99.

"Connecting to On–Line Car Shoppers: Auto Sellers Use Netcall Internet Call—Button Technoloy to Turn Clicks into Interactive Sales", Business Wire, p 4089., 7/99.

Davey, Tom, "Wheeling and Dealing Online", PC Week, vol. 13, No. 45, pp. 1, 129., 11/96.

Collett, Stacey & Julie King, "Why Online Browsers Don't Become Buyers", Computerworld, vol 33, No. 48, p. 14.

"Walker Digital Issued Landmark U.S. Patent No. 5,862,223 for Global Internet Marketplace for Experts", Business Wire, Jan. 26, 1999.

Qcircuit Web Site (www.qcircuit.com).

Infomarkets.com Web Site (www.infomarkets.com).

Intellect Exchange Web Site (www.intellectexchange.com).

Answers.com Web Page (www.answers.com).

Chris Ott, "Making Good on the Information Economy", Denver Business Journal, Dec. 17, 1999, p. 27.

Michael Rogers et al, "Experts abound at New Web Sites", Library Journal, Mar. 1, 2000, pp. 22–24.

"Surfbrains.com: Brains online save time & money", M2 Presswire, Jul. 11, 2000.

Cynthia Hodgson, "Online Expert Databases & Services", Econtent, Dec. 1999, p. 48–53.

Information about Expertcity.com retrieved from the Internet [URL: http//www.expertcity.com] on Nov. 6, 2000.

"Rent–An Expert On the Web", Information Week, p. 75, 9/99.

"Expercity.com Launches Premier Online Marketplace for Expert Services", PR Newswire, 8/99.

Information about keen.com retrieved form the Internet [URL: http://www.keen.com], on Oct. 24, 2000.

John Healy, "From A–Z, You Can Sell Advice Online". Mercury News retrieved from http://wwwO.mercurycenter.com on Oct. 24, 2001.

Jeff Peline, "Net Firm to Connect Users by phone", CNET News.com, retrieved from http://news.cnet.com on Oct. 24, 2001.

"Keen.Com Launches First Live Answer Community", Press release retrieved from http://www.keen.com on Oct. 24, 2000.

Joseph Menn, "An Expert? There's Now a Home for You on the Internet", Los Angeles Times retrieved from http://www.denverpost.com on Oct. 24, 2001.

The Voice of Technology, Credit World, pp 20–23, Jul. 1994.

Telecommunications Buyers Guide and Directory, Editor & Publisher, pp 29TC–38TC, Feb. 1994.

Aspect Telecomm: Aspect Integrates the Web into the Call Center, M2 Presswire, Aug. 1996.

Information, Bid and Asked, Forbes, Aug. 20, 1990, 92.

Attachmate Ready to Answer 'Net questions, Network World, Apr. 8, 1996, 37.

US Courts to Launch First Federal 900 Service, Federal Computer Week, Sep. 28, 1992, 8.

Company Devoted to Hot–Line Support, Computer Reseller News, Oct. 21, 1991, 48.

For Telesphere's Clients, Dial '1–900 TUF LUCK', Business Week, Sep. 9, 1991, 88.

When Business Plan and real World Clash, Wall Street Journal, Jun. 9, 1999, B1.

Hidden Cost of Tech Support, PC World, May 1995, 143.

Net Bazaar: Networked Electronic Markets for Trading Computation and Information Services, ECDL 1998—Research and Advanced Technology for Digital Libraries, 839.

Multimedia Collaborative Remote Consultation Tools via Gigabit WAN in Teleradiology, IEEE 1994 Phoenix, 417.

Multimedia Communication in a Medical Environment, IEEE 1991 Singapore I.C. on Networks, 166.

A New Teleconsultation Terminal System Using ISDN, NTT Review, Jul. 1991, 37.

MiniPay: Charging Per Click on the Web, CNISDN, 1997 v29, 939.

Caring for Customers: Real–time text chat and telephony provide personalized customer support and turn queries into sales leads, Internet World Media, Sep. 1999.

Kiyoshi Kabeya, Akihiro Tomihisa and Sueharu Miyahara, "A New Teleconsultation Terminal System Using ISDN," NTT Review, vol. 3, No. 4, Jul. 1991, pp. 37–43.

Masahiko Hase, Shuji Kawakubo and Mineo Shoman, "Advanced Videophone System Using Synchronized Video Filing Equipment," NTT Review, vol. 3, No. 4 Jul. 1991, pp. 29–36.

Franco Mercalli and Roberto Negrini, "The ESSAI Teleshopping System: An Example of a Broadband Multimedia Application," Publication No. 0–7803–1820–X/94, IEEE, 1994, pp. 572–576.

Abhaya Asthana and Paul Krzyzanowski, "A Small Domain Communications System for Personalized Shopping Assistance," Proceedings of ICPWC'94, Publication No. 0–7803–1996–6/94, IEEE, 1994, pp. 199–203.

Linda Littleton, "Meet the Shadowy Future," Proceedings ACM SIGUCCS User Services Conference XXII, Ypsilanti, Michigan Oct 16–19, 1994, pp. 205–210.

L. F. Ludwig and D.F. Dunn,"Laboratory for Emulation and Study of Integrated and Coordinated Media Communication," Conference on Office Information Systems, Mar. 23–25, 1988, Sponsored by ACM SIGOIS and IEEECS TC–OA in cooperation with IFIP W.G. 8.4, pp. 283–291.

E.J. Addeo, A.B. Dayao, A.D. Gelman and V.F. Massa, "An Experimental Multi–Media Bridging System," Frontiers in Computer Communications Technology, Computer Communications Review, vol. 17, No. 5, Aug. 11–13, 1987, pp. 236–242.

ISDN Tutorial:Definitions, http://www.ralphb.net/ISDN/defs.html, printed on Apr. 21, 2000.

ISDN Tutorial: Interfaces, http://www.ralphb.net/ISDN/ifaces.html, printed on Apr. 21, 2000.

* cited by examiner

METHOD AND APPARATUS FOR PROVIDING GROUP CALLS VIA THE INTERNET

This application is related to co-pending application U.S. application Ser. No. 09/414,710 filed on Oct. 8, 1999 and entitled "System for providing services in real-time over the internet," the entire contents of which are hereby incorporated by reference herein.

BACKGROUND OF THE INVENTION

1. Field of the Invention

The present invention relates generally to electronic commerce using digital and analog networks. More specifically, the present invention relates to a network application for conducting group call communication sessions between customers and a service provider.

2. Description of the Related Art

Customers interested in acquiring services must first identify the service provider who is capable of providing the required services. At present, this usually means perusing a telephone directory, which can become frustrating and time-consuming if the service providers telephoned are not immediately available. A phone book (whether a bound paper book or an electronic directory) is also not very effective if the service provider's business category is not known.

Over the years, a number of systems have been developed that partially address this problem. In particular, these include systems that attempt to match potential customers with potential service providers. They range from free bulletin-board-style Internet web sites to sophisticated Internet-based consulting services.

Once a service provider has been identified and has agreed to provide the requested services to the user, the service provider may wish to charge the user for providing the requested services. In many cases, the service provider will charge the user based upon the time it takes to provide the requested services. Some devices exist to automate the billing of time for services rendered. 1-900 telephone numbers, for instance, automatically calculate the time that services are rendered through the telephone and bill the customer accordingly.

However, available systems are not able to connect service providers with many buyers at the same time. Some services—such as tutoring or celebrity events—can be administered to many buyers at once. Teachers, for instance, often charge their students by the hour to attend a seminar. Currently, however, there is no way for a teacher using an Internet system to indicate that services are now in session and that students can each join the interactive conference and be charged on a per-time basis.

Current systems that attempt to connect service providers with many buyers at once are based largely on the broadcast model of service providing. For instance, a speech may be broadcast on a certain channel at a specific time. All buyers who would like to listen to this speech can pay a fee and gain access to the channel for an amount of time. This system, however, has rigidities that prevent its effective use. Firstly, a broadcast is a one-way transmission. Many services—such as tutoring or celebrity events—require two-way communication in real time. Secondly, a service provider cannot easily indicate to an audience whether the broadcast service is on or off; broadcasts must therefore be rigidly scheduled to be on at definite times.

SUMMARY OF THE INVENTION

A method and apparatus for implementing group calling is disclosed. In one embodiment, the method includes displaying a service provider, a service provider rate for communicating with the service provider, and a real-time indication of whether the service provider is available. The method further includes receiving a request from a first customer to communicate with the service provider and connecting the first customer to the service provider through a link capable of transmitting from the service provider to the first customer. The method also further includes receiving a request from a second customer to communicate with the service provider and connecting the second customer to the service provider through a link capable of transmitting from the service provider to the second customer while the first customer is coupled to the service provider. The method also includes billing the first customer automatically based on the time during which the link to the first customer is maintained; and billing the second customer automatically based on the time during which the link to the second customer is maintained. The method may further include connecting the service provider to a plurality of customers.

In an alternative embodiment, a system may include logic blocks suitable for performing the method described above or for otherwise implementing a system for connecting a plurality of customers to a service provider. Furthermore, such a system may be suitable for interaction with a moderator and/or an intermediary. Moreover, such a system may include a communications interface and a controller computer.

BRIEF DESCRIPTION OF THE DRAWINGS

The present invention is illustrated by way of example and not limitation in the accompanying figures.

DETAILED DESCRIPTION

A method and apparatus for implementing group calls is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, a system for group calling allows providers of services (service providers or information providers) to communicate and sell their services to many buyers at once in a virtual conference. An embodiment may enable the provider to indicate to an audience of buyers whether services are available or unavailable at the current time. Buyers can read a description of the service provider and the price to take part in the conference. If services are currently available, buyers can join the conference, and in doing so, will be connected with a one-way or two-way communications link and be automatically charged the fees for the services.

One embodiment includes an Internet web site as part of the delivery mechanism of the invention. Customers who would like to speak with a particular service provider can see whether that provider is immediately available or not. It available, the buyer can be connected to the provider with a two-way communications link in real time. If the service provider is already in session with a first buyer, the second buyer can join the conference and be connected with a two-way communications link with all members of the conference. The buyer will automatically be charged the fees for taking part in the conference.

Another embodiment enables the service provider to speak to many buyers at once through the guidance of a moderator. If a buyer chooses to join a conference and communicate with the speaker, the moderator can decide whether to give the buyer listening and speaking privileges or just listening privileges. The buyer can in turn be charged different fees depending on which privileges are granted. The moderator can also turn off any buyer's speaking privileges or remove a buyer from the conference entirely.

Figure 1:
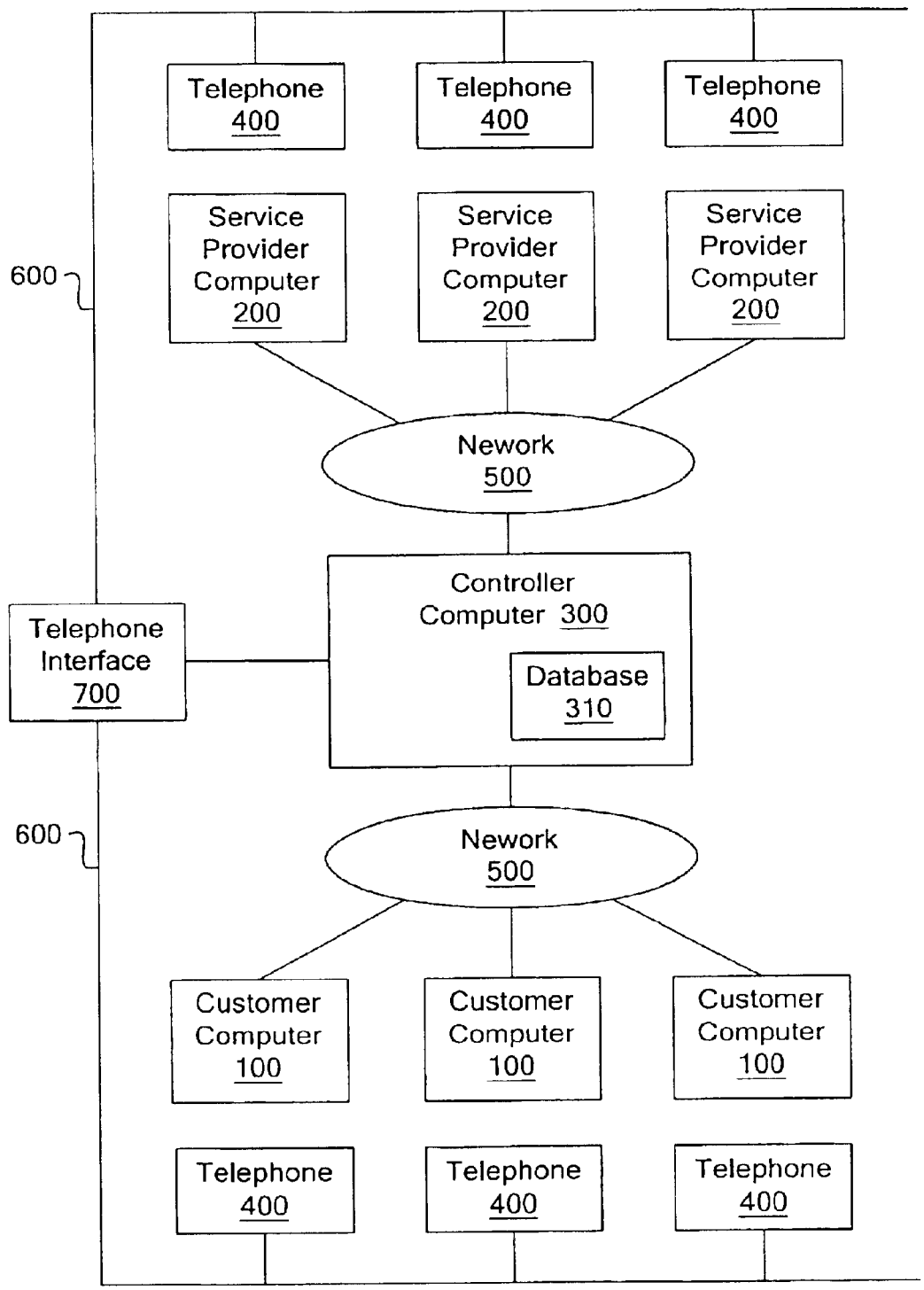
FIG. 1 illustrates a system for identifying information providers and connecting customers with information providers in accordance with one embodiment of the invention.
Figure 2:
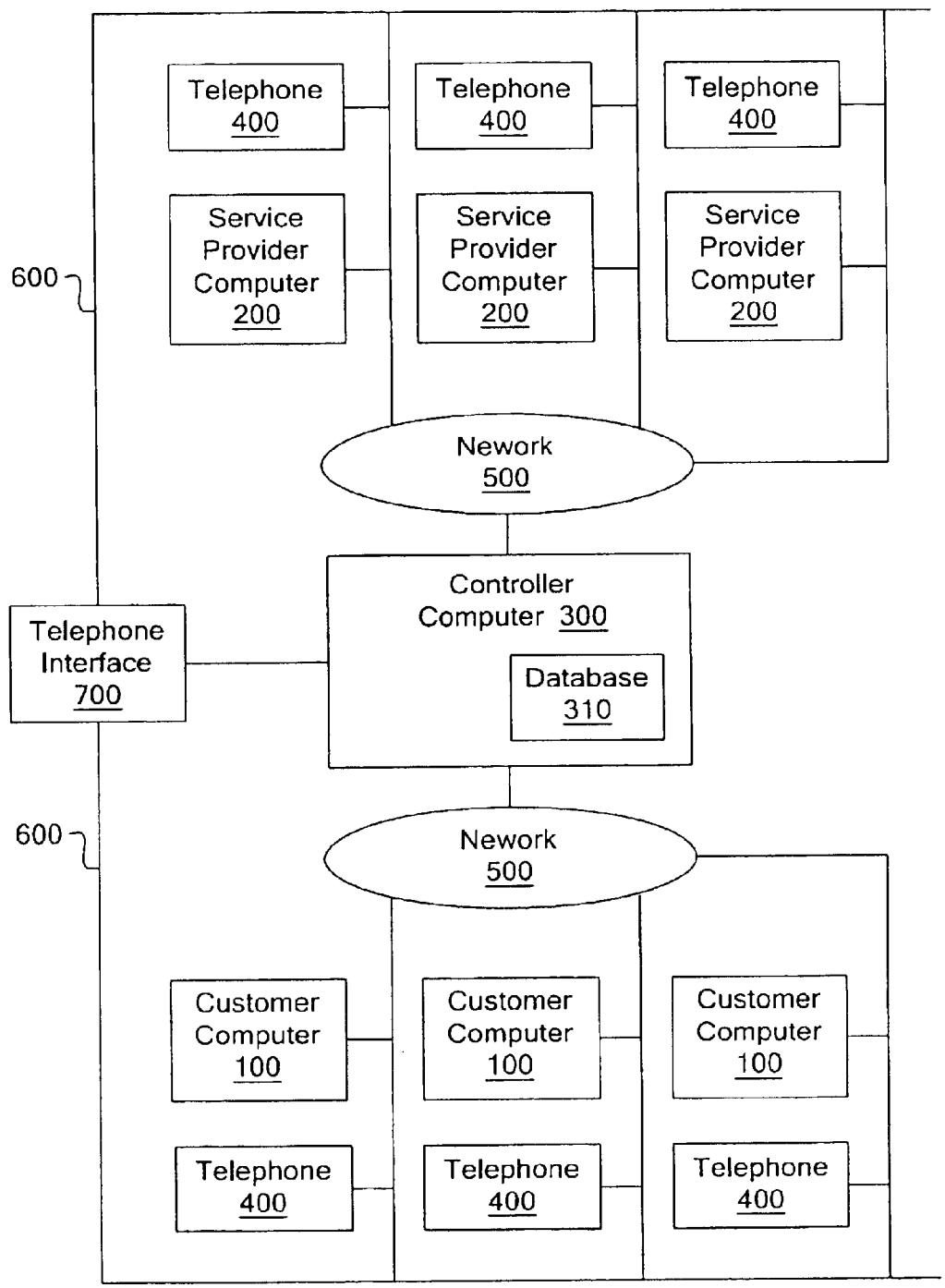
FIG. 2 illustrates an alternative embodiment of the system for identifying information providers and connecting customers with information providers.

FIG. 1 shows one embodiment of a system in which the systems and methods of the present invention may be incorporated. User computers ("customer computers") 100 and information provider computers ("service provider computers") 200 are coupled through a network 500 (such as the Internet) to a host computer or web server ("controller computer") 300. Persons skilled in the art will recognize that the controller computer 300 may consist of more than one computer working together to provide the controller computer functions described herein. The users (customers) and information providers (service providers) each have telephones 400 that are coupled to the telephone network 600. In FIG. 1, the computer network 500 and telephone network 600 are shown as two separate entities, though persons skilled in the art will realize that they can overlap, as illustrated in FIG. 2 for example.

The controller computer 300 has the functionality of a web server, capable of interacting dynamically via the service provider computers 200 and the customer computers 100 with service providers and customers, respectively. In addition to web server operation, the controller computer 300 is linked to a telephone interface 700 that enables the controller computer 300 to set up, initiate, confirm, and track conversations between the customers and the service providers. The controller computer 300 has the ability to establish a real-time communications connection between service providers and customers for the purpose of conveying information in real-time in an interactive manner.

In accordance with the embodiment shown in FIG. 1, the customer computers 100 and the service provider computers 200 are connected to the controller computer 300 through the network 500. Customers and service providers use their computers to connect to the Internet network 500. Once a connection has been established, service providers and customers will enter the URL, or Internet address, of the controller computer 300, and a logic unit within the controller computer establishes a computer connection with the customer computer 100 and the service provider computer 200. In one embodiment, after the computer connection has been established between the controller computer 300 and the service provider and customer computers, 200 and 100, respectively, a logic unit within the controller computer presents a web page on the service provider and customer computers.

Typically, customers and service providers register before customers can purchase services or information and before service providers can offer their services or information through the web site. During registration, the customers and the service providers are requested to submit certain information, such as a username and password. Customers may be requested to submit credit card or other financial information. Service providers may or may not be requested to submit credit card or other financial information. Once the requested information has been submitted, the data is stored in the database 310 in a service provider account set up for the service provider and in a user account set up for the customer.

A logic unit within the controller computer 300 may present a web page on the customer computer 100 and the service provider computer 200 through which the logic unit prompts the customer and the service provider to submit the requested registration information. The logic unit is linked with the database 310 and so automatically sets up the service provider account and the user account and automatically stores the submitted registration information in the appropriate accounts on the database 310.

Service providers typically submit a description or a listing for each service they will provide through the web site. After the description or listing has been stored by the controller computer 300, the service described may be offered to all of the users who browse the web site. Access to the web site may be established as described above, with the customer using a user computer ("customer computer") 100 to connect to a network 500 and then entering a URL suitable for connecting or coupling to the controller computer 300. A logic unit within the controller computer 300 then establishes a computer connection with the customer computer 100.

After the computer connection has been established, in one embodiment customers will have the option of executing a keyword search for service providers. The keyword search can be executed from a web page presented by a logic unit of the controller computer 300 on the customer computer 100. A keyword search typically consists of scanning a database for words that match the keywords entered. In this embodiment, the keyword search will be executed against the stored descriptions and listing data. In one embodiment, customers will view a list of service providers matching the keyword search criteria on a web page presented by the logic unit on the customer computer. Customers will have the option of viewing the service providers listed according to price, availability, or customer evaluations in either ascending or descending order, though the service providers can be listed in any number of ways. As an alternative to a keyword search, customers can select a category to view a predetermined list of service providers.

Figure 3:
FIG. 3 illustrates one embodiment of an information provider's listing page on which potential users can read a description of the information provider and see a rate the information provider charges to communicate.

In one embodiment, a logic unit within the systems presents, in response to a customer selection of a service provider from the list, a listing page that contains additional information about the selected service provider and the selected information service. FIG. 3 illustrates one embodiment of a listing page that provides more detailed information about a service provider that goes by the name of Jim. The listing page 1000 shown in FIG. 3 provides a brief description of the information services provided 1010 and may also include rating information 1020, a picture of the service provider 1030, a rate or price per minute 1040, as well as other information that the potential customer may find helpful such as the educational background or other credentials of the service provider 1045. The listing page 1000 includes an icon 1050 indicating that this service provider is available at this very moment. The icon 1050 may also include accompanying hyperlinks that enable the customer to call or e-mail 1055 the service provider. It will be appreciated that the icon 1050 may also indicate the service provider is not available when such an indication is appropriate. The information provided in a listing page may be conveyed in other forms, e.g., instead of a picture or photo 1030 the service provider may choose to be represented with an avatar or other information-rich graphic, and may include other types of information in addition or instead of the information shown in the embodiment of FIG. 3.

When a customer decides to receive information or services from the service provider, the customer may request to have a real-time communications connection established with the service provider. For example, from the listing page illustrated in FIG. 3, a customer may click on the "Call Now" hyperlink 1050 to send such a request and, in response, a logic unit within the system attempts to establish a real-time communications connection between the customer and the service provider.

Figure 4:
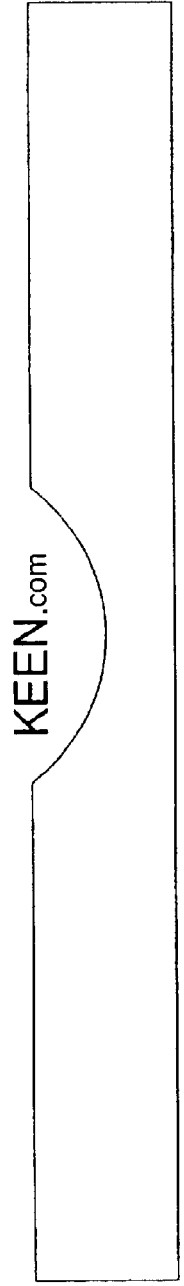
FIG. 4 illustrates one embodiment of a web page shown to a user who has successfully requested to listen or talk to a service provider.
Figure 4:
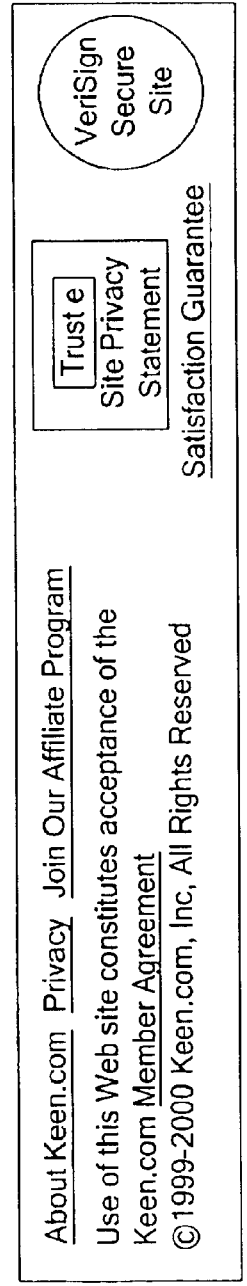

In one embodiment, a logic computer within the system presents a web page, such as the one depicted in FIG. 4, to the customer after receiving the request to communicate with the service provider. The web page 1500 informs the customer that the real-time communications connection or link is being established and may, if necessary, provide instructions to establish the communications connection. Note that communication in this context may have a one-way or two-way form, such that communication may be limited to the customer listening to the service provider, or it may be a two-way communication between the customer and the service provider. Furthermore, note that the link or connection may be established over a variety of media or combinations of media as described elsewhere in the present application.

Figure 5:
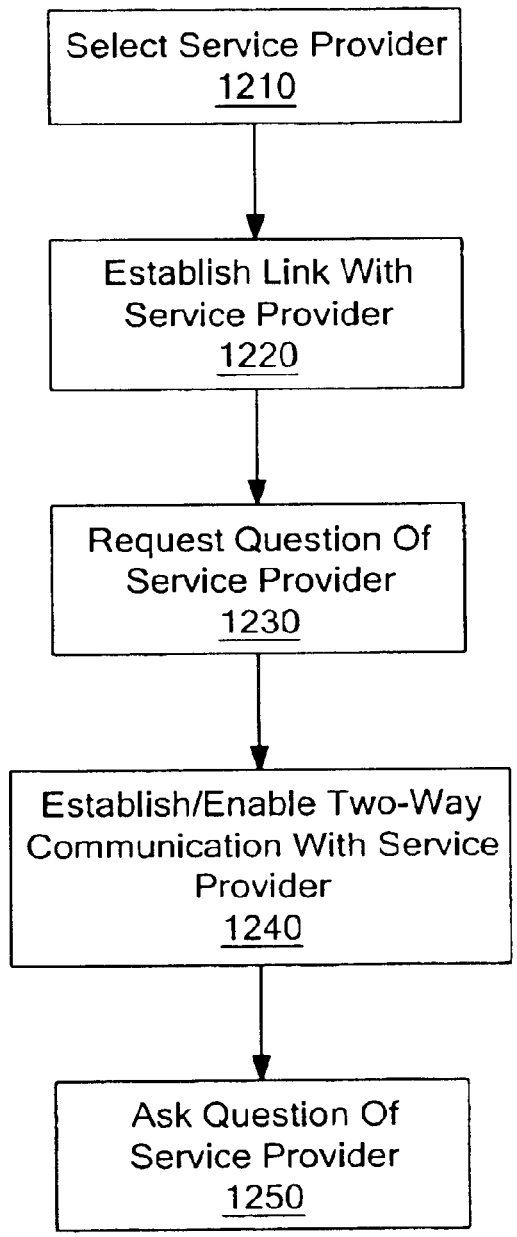
FIG. 5 illustrates an embodiment of a process of participating in a group call.

An illustration of an embodiment of participation in a group call is presented in FIG. 5. At block 1210, the customer selects a service provider who the customer wishes to communicate with. At block 1220, a communications link is set up between the customer and the service provider. This communications link may allow for one-way or two-way communications, and this may be dependent on what the customer and service provider desire. In the present illustration, the communications link is initially a one-way link. At block 1230, the customer decides to ask a question of the service provider, and thus requests a two-way link. The two-way link is established or enabled at block 1240, and at block 1250, the customer asks the question.

It will be appreciated that asking the question may be more involved than a simple question, and may require a dialog, or that asking a question may represent conversing with a service provider without following a question-and-answer paradigm. Likewise, it will be appreciated that in some embodiments, the initial link established between the customer and the service provider may be a two-way communications link which allows for two-way communications without a request for such two-way communications. Furthermore, it will be appreciated that the management of multiple customers in a group call may require attention that would detract from provision of services by a service provider, such that an intermediary or moderator may be useful for purposes of managing interactions with customers.

Figure 6:
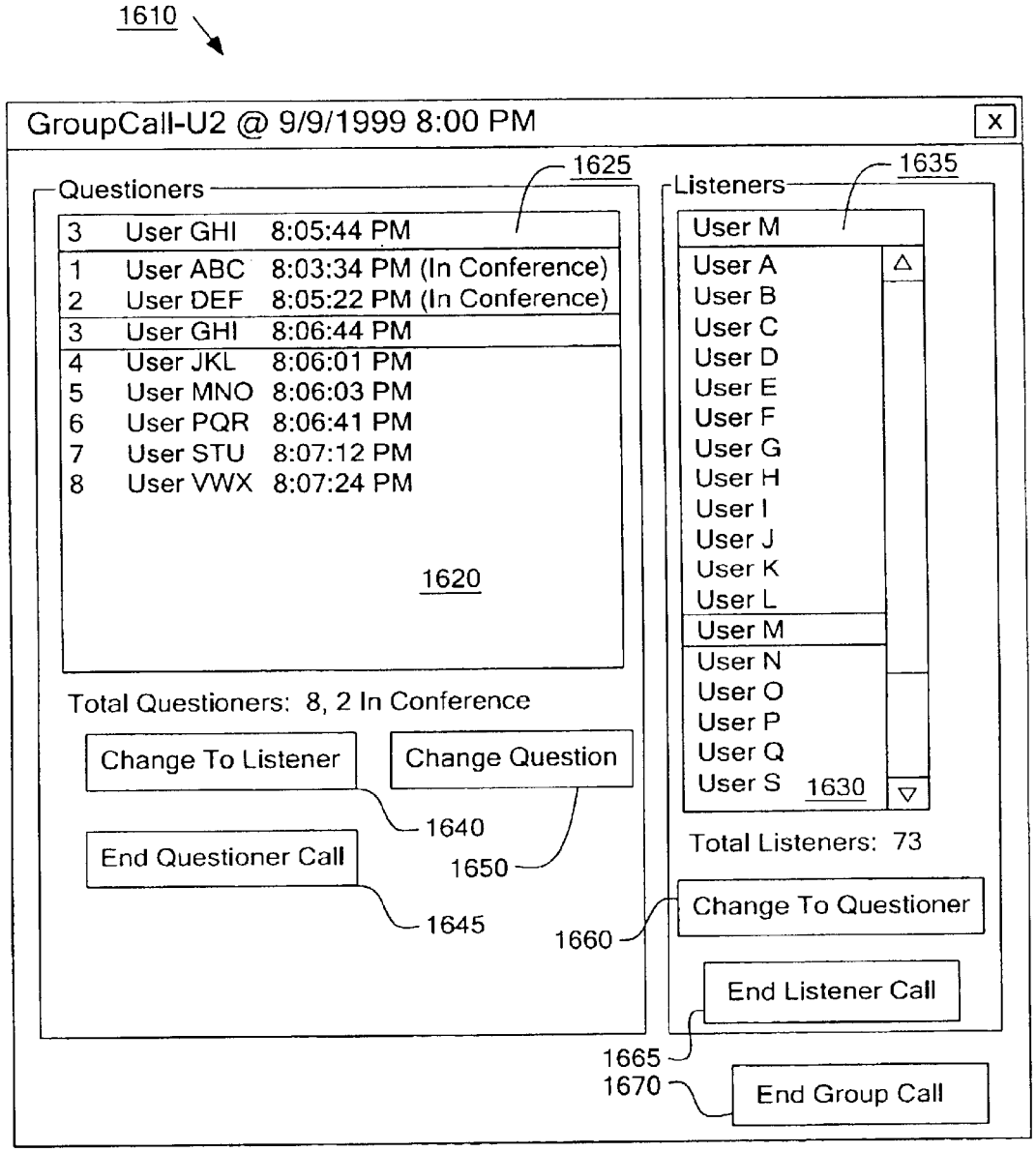
FIG. 6 illustrates a graphical user interface suitable for use by a moderator of a group call.

FIG. 6 illustrates an embodiment of a graphical user interface suitable for use by a moderator of a group call, who may have discretion to perform such functions as: add listeners, change listeners to questioners or conversers, or remove participants (listeners, questioners and conversers). Window 1610 includes a questioner section and a listener section. List 1620 displays a list of callers who are waiting to ask questions of the service provider, and further illustrated are the first two questioners who are currently asking questions of the service provider. The remaining questioners are communicating with the service provider, but since they are not selected to ask questions, they cannot speak to the service provider. Selected questioner box 1625 illustrates the selected questioner, in this example the third questioner. For the selected questioner, three buttons allow for changes in the status of the questioners. Button 1640 allows for changing a questioner to a listener. Button 1650 allows for hearing a question from a questioner, essentially moving the questioner to an in conference state or out of a queue of waiting questioners. Button 1645 allows for ending a questioner's call, and may be invoked due to a questioner having run out of allotted time or credit, or for disciplinary reasons and the like. By selecting each of the questioners within the list 1620, changes can be effected for each questioner.

In one embodiment, in the listener section, list 1630 displays all of the listeners to the group call. Each of the listeners communicate with the service provider, but can only hear what the service provider is saying, they cannot interact directly with the service provider. Selected listener box 1635 illustrates the selected listener, in this example listener 'User M.' Two buttons allow for changes to the status of the selected listener. Button 1665 allows for ending the listener's call, for example when the listener runs out of credit. Button 1660 allows for changing the selected listener to a questioner, for a fee or an increased rate of payment. Additionally, button 1670 allows for ending the group call, or terminating the session in which the service provider is providing services or speaking to the group.

Participation in a group call necessarily implies a process for multiple customers, and allowing for or managing such a session may require restrictions on the interactions between the customers and the service provider. In a classroom setting, a service provider may lecture, and accept questions based on the service providers wishes or decisions of a moderator. Similarly, answering a question asked by the service provider may be viewed as asking a question, and any action allowing for communication from the customers to the service provider may thus be treated as analogous to asking a question of the service provider.

Note that the roles of the moderator and any intermediary may be automated and performed by logic blocks such as software executed by a processor or portions of a device or machine or circuitry. The examples discussed previously with respect to a system or apparatus for connecting customers and service providers may, in one embodiment, perform these roles. Furthermore, the roles of moderator and intermediary may be combined, such that an intermediary performs the role of moderator. Likewise, the moderator and the intermediary may interact, such that one takes direction or instructions from the other.

Figure 7A:
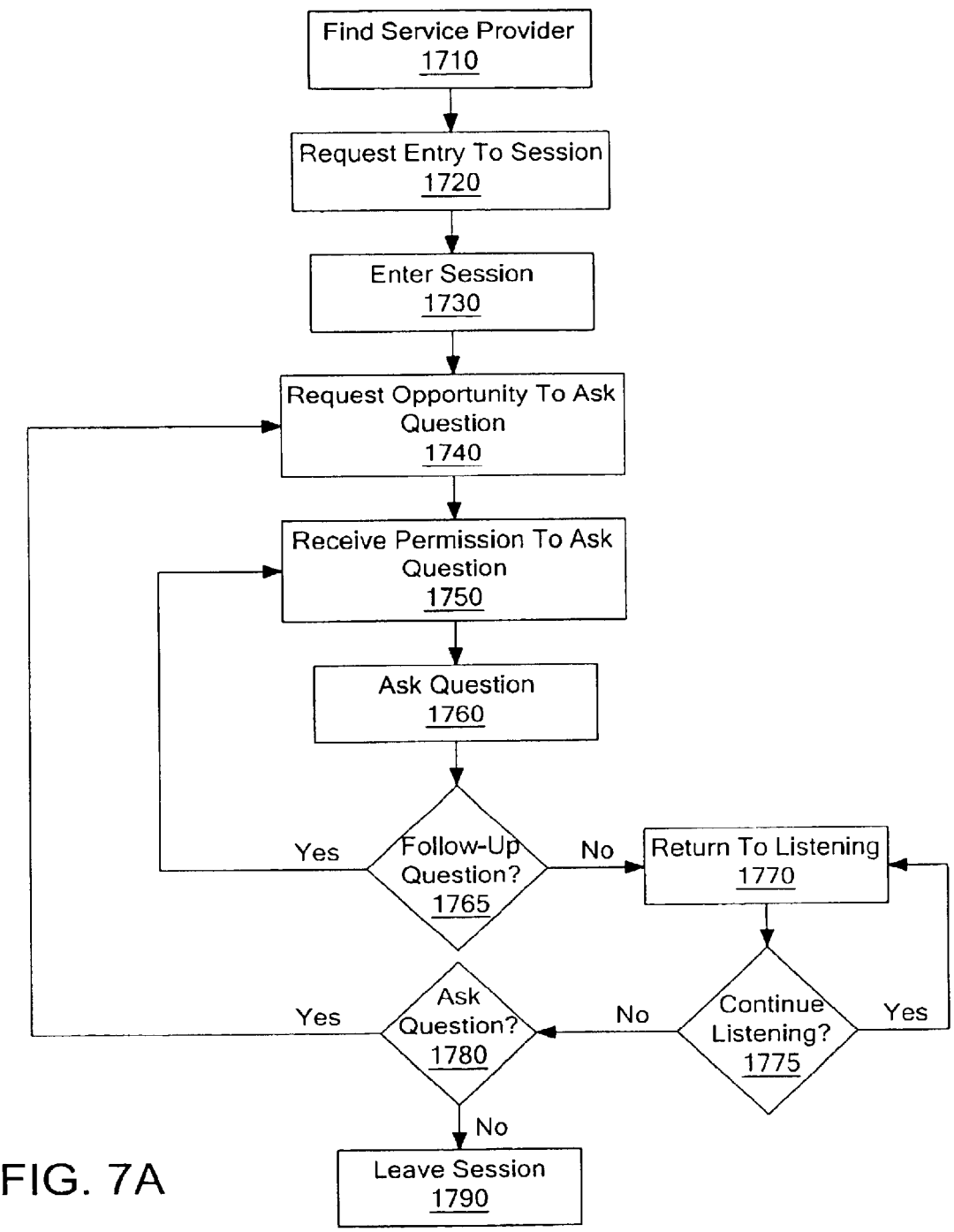
FIG. 7a illustrates an embodiment of a process of participating in a group call from a customer's point of view.

FIG. 7a illustrates an embodiment of a process of participating in a group call as perceived by a customer. At block 1710, the customer selects a service provider from a set of service providers, such as a set of service providers viewable on a website. At block 1720, the customer requests entry into a session with the service provider. This may involve initiation of a session, joining a session in progress, or joining a regularly scheduled session which has yet to begin for example. At block 1730, the customer enters the session, thereby gaining access to the information being transmitted as part of the session. In one embodiment, the session may be entertainment, informative, or otherwise allow for at least one-way transmission of information.

At block 1740, the customer requests an opportunity to ask a question, possibly in exchange for a fee or surrender of some amount of credit. At block 1750, the customer receives permission to ask the question from a moderator or intermediary such as an automated moderating program or a human moderator. Receiving permission, in some embodiments, may also involve a temporary enablement of transmission from the customer to the service provider, in either a half-duplex or full-duplex manner. Any change from a listener to a questioner or converser may include further instructions delivered on a webpage similar to that illustrated in FIG. 4, or may include instructions delivered over the telephone, for example.

At block 1760, the customer asks the question, and presumably receives some form of answer or acknowledgment from the service provider. This may satisfy the customer. However, at block 1765, the customer makes a decision about whether to ask a follow-up question, which, in one embodiment, requires a separate fee or surrender of credit. If a follow-up question is desired, the process proceeds to block 1750. If a follow-up question is not desired, the process proceeds to block 1770, and the customer continues to communicate with the service provider by listening to the session. The process also includes block 1775, in which the customer decides whether to continue listening to the session, although this may be embodied in the act of listening to the session. Should the customer decide not to listen to the session, at block 1780 the customer makes a choice between asking another question and thus proceeding to block 1740, or leaving the session and thus proceeding to block 1790. In one embodiment, the customer is charged or surrenders credit on an ongoing basis at a rate per unit time, such as a rate per minute, and the customer may involuntarily leave the session when the customer's credit is exhausted.

Figure 7B:
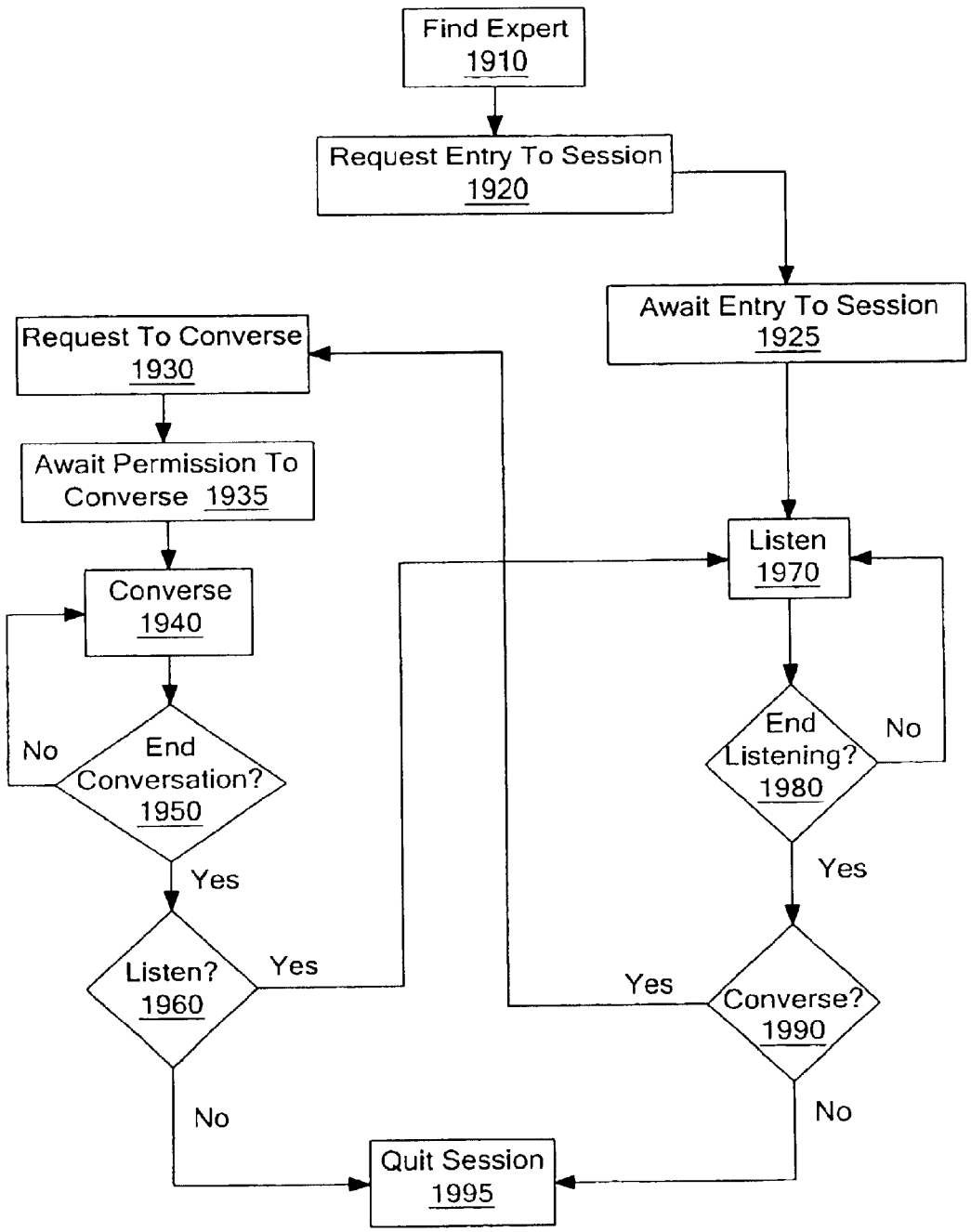
FIG. 7b illustrates an alternate embodiment of a process of participating in a group call from a customer's point of view.

FIG. 7b illustrates an alternate embodiment of a process of participating in a group call as perceived by a customer. At block 1910, the customer finds an expert or service provider whose session the customer wishes to enter. At block 1920, the customer requests entry to the session, and at block 1925, the customer awaits entry to the session. Entry to the session may be carried-out as described earlier with respect to actual connection to an expert or service provider. Upon connecting to the session, the customer communicates with the service provider by listening to the session at block 1970. It will be appreciated that a session may use a medium other than sound, such that listening or communicating may represent watching a video presentation or experiencing some form of multimedia presentation, and that a customer may pay for the privilege of listening, watching, or otherwise experiencing a presentation. At block 1980, a decision is made as to whether to continue listening to the session, and this either results in a return to block 1970 or progression to block 1990.

At block 1990, a decision is made as to whether to converse with the service provider. This may require payment at a higher rate or of a lump sum. Choosing not to converse and not to listen implies progression to block 1995 and quitting the session. Choosing to converse results in sending a request to converse at block 1930, which may be fielded by the service provider or by some intermediary or moderator. At block 1935 the customer awaits permission to converse (and presumably continues to listen, although this need not be true). At block 1940, the customer converses with the service provider, either for a predetermined amount of time or until an event causes a decision to end the conversation at block 1950. Such events may include a choice by the customer or depletion of the customer's credit to levels too low to allow continued conversation. At block 1960, a decision is made as to whether the customer wishes to listen to more of the session at block 1970 or to quit the session at block 1995.

Figure 8:
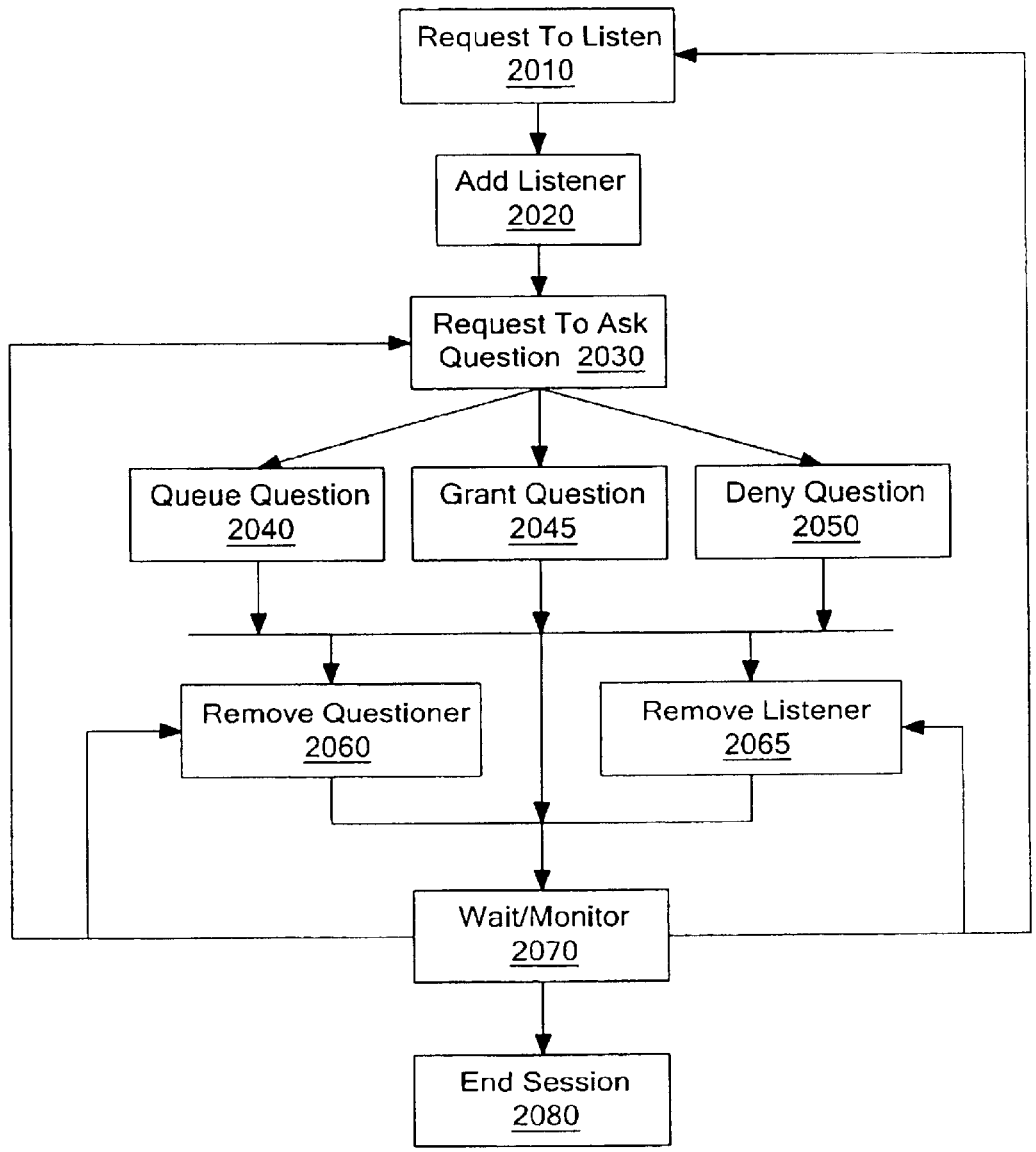
FIG. 8 illustrates an embodiment of a process of participating in a group call from a moderator's point of view.

FIG. 8 illustrates an embodiment of a process of participating in a group call from a moderator's point of view. Note that the moderator may be a person interacting with a group of customers and a service provider, the service provider, or some other form of intermediary such as an automated program or device. In one embodiment, the intermediary is a controller computer such as was described with respect to FIGS. 1 and 2, and the moderator is a person who is in communication with the controller computer. At block 2010, the moderator receives a request to enter a session from a customer. At block 2020, the customer is added to the session by the moderator, which may involve connecting the customer to the session in a manner such as that described with respect to connecting a customer a service provider. At block 2030, a request to ask a question from a customer connected to the session is received. Three options are available, the moderator may queue the question (2040), grant the opportunity to ask the question (2045) or deny the opportunity to ask the question (2050).

After adding a customer or handling a request to ask a question, the moderator may either remove a questioner from the session (2060), remove a listener (2065) or wait and monitor the session (2070). From block 2070, the moderator may move to block 2010 (receiving another request to enter), block 2030 (receiving another request to ask a question), block 2060 (removing a questioner) or block 2065 (removing a listener). Likewise, the moderator may move to block 2080 and terminate the session as appropriate. It will be appreciated that if questions are queued (as per block 2040), the queued questions may periodically generate requests to ask questions (as per block 2030), thus resulting in either maintenance or advancing of the queue.

Figure 9:
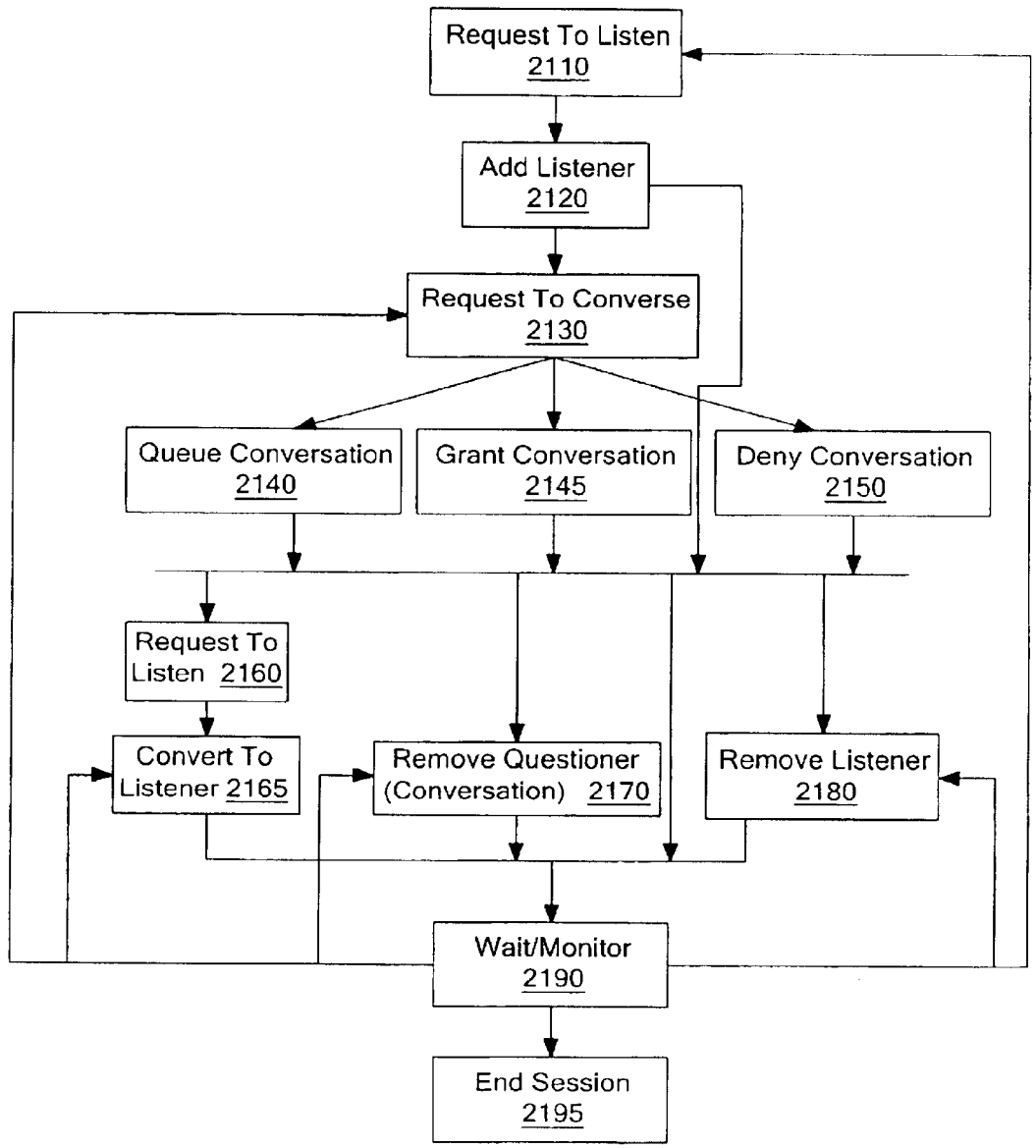
FIG. 9 illustrates an alternate embodiment of a process of participating in a group call from a moderator's point of view.

FIG. 9 illustrates an alternate embodiment of a process of participating in a group call from a moderator's point of view. At block 2110, the moderator receives a request to enter a session from a customer. At block 2120, the customer is added to the session by the moderator, which may involve connecting the customer to the session in a manner such as that previously described. At block 2130, a request to converse with the service provider from a customer connected to the session is received. Three options are available, the moderator may queue the request (2140), grant the opportunity to converse (2145) or deny the opportunity to converse (2150).

After adding a customer or handling a request to converse, the moderator may either remove a questioner (someone conversing with the service provider) from the session (2170) or remove a listener (2180). Additionally, the moderator may receive a request by a questioner to listen (block 2160) and convert the questioner to a listener (2165) or wait and monitor the session (2190). From block 2190, the moderator may move to block 2110 (receiving another request to listen), block 2130 (receiving another request to converse), block 2165 (converting to a listener), block 2170 (removing a questioner) or block 2180 (removing a listener). Likewise, the moderator may move to block 2195 and terminate the session as appropriate. It will be appreciated that if requests to converse are queued (as per block 2140), the queued conversation participants may periodically generate requests to converse (as per block 2130), thus resulting in either maintenance or advancing of the queue.

Figure 10:
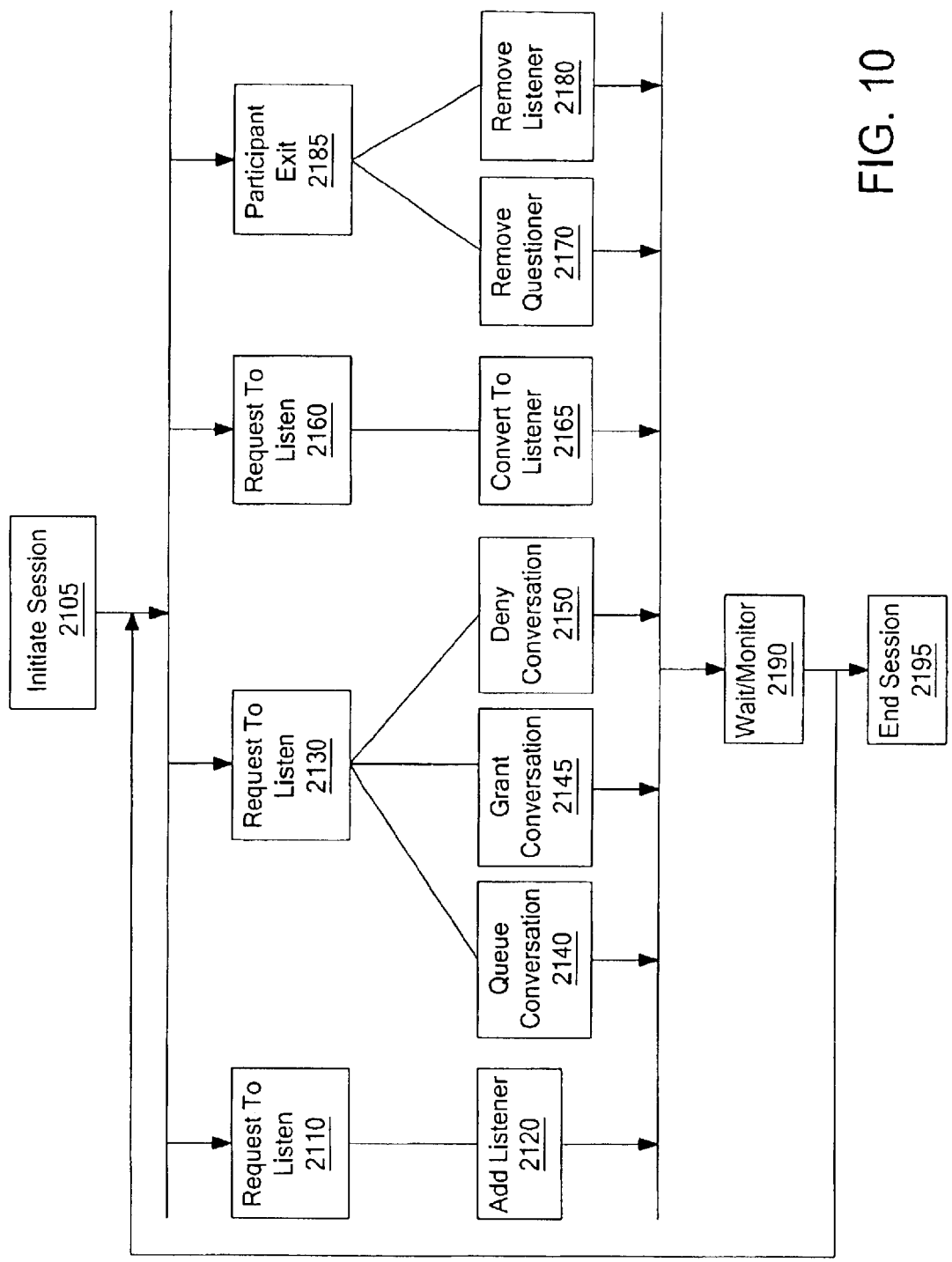
FIG. 10 illustrates another alternate embodiment of a process of participating in a group call from a moderator's point of view.

FIG. 10 illustrates another alternate embodiment of a process of participating in a group call from a moderator's point of view. This embodiment illustrates what may be the essentially parallel nature of the moderator's role in some embodiments. This embodiment illustrates that the moderator may have control over initiation of the session at block 2105 prior to addition of any customers, and illustrates that a participant's exit at block 2185 (either a questioner or listener) may result in removal of the participant. Note that the participant may choose to exit or may exit involuntarily.

Figure 11:
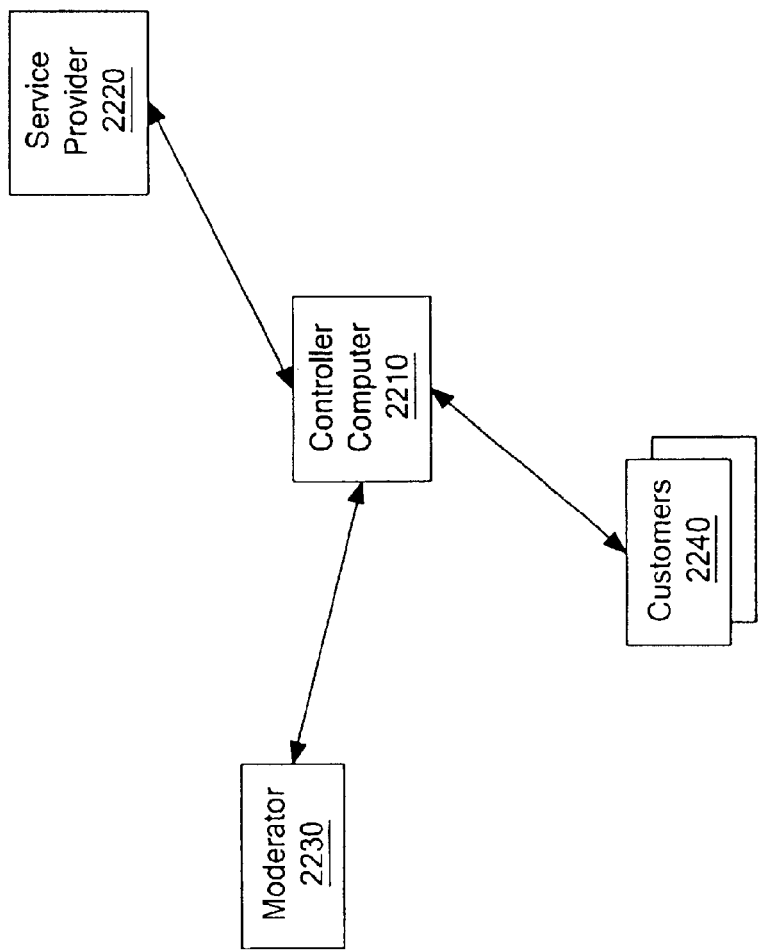
FIG. 11 illustrates relationships in one embodiment of a method or apparatus for a group call.

FIG. 11 illustrates relationships in one embodiment of a method or apparatus for a group call. The controller computer 2210 may be the intermediary in one embodiment. Coupled to the controller computer 2210 are the service provider 2220, a set of customers 2240 (such as a first customer and a second customer) and possibly a moderator 2230. The moderator 2230 or the service provider 2220 may provide instructions to the computer 2210 to connect, disconnect, or change the status of customers 2240 for a given session. The links between the components of FIG. 11 may be formed through use of the internet, telephony, optical, electromagnetic, or other electrical and/or mechanical means.

A system may provide all or some of the above group calling features using other communications means, such as via e-mail, or over a telephone network, a computer network, a satellite network, a wireless communications network, a direct TV network, etc. For example, the customer may communicate (i.e. listen) over a telephone connection to the group call. Additionally, the system may receive a request to talk or converse over the telephone connection via the telephone keypad or with voicerecognition software. Similarly, a group calling method is not limited to the systems described above and may be implemented using other communications means.

In particular, a system for implementing group calling and/or a method of implementing group calling may involve a processor executing instructions. Such instructions, when executed by the processor, may cause the processor to perform a method as illustrated elsewhere in this document. Such instructions may be embodied in a machine-readable medium, such as a persistent storage medium or other medium coupled to or accessible by the processor. The medium may be an electronic medium such as RAM or a variant of ROM, it may be a magnetic medium such as a disk or tape, an optical medium such as a CD-ROM, a carrier wave or other transmissive medium, or other media as appropriate. Furthermore, the instructions may be embodied in multiple media, either of a uniform type of medium or a variety of types of media.

Figure 12:
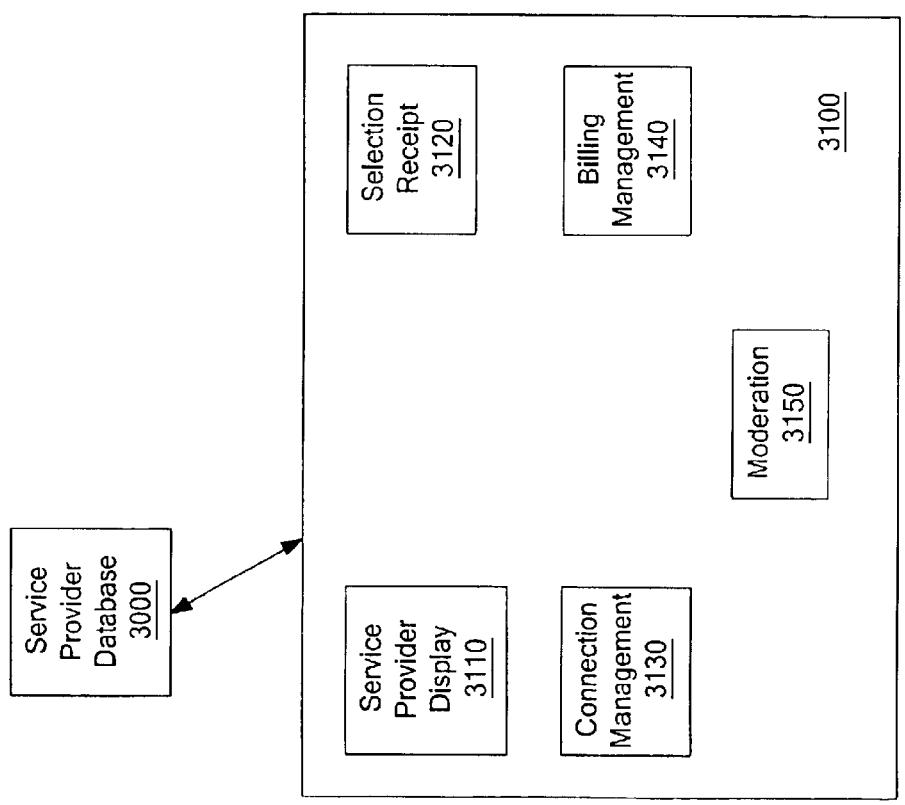
FIG. 12 illustrates a block diagram of an embodiment of a system.

A block diagram of an embodiment of a system is illustrated in FIG. 12. Such a block diagram may be implemented as instructions in a machine-readable medium (or media) or as a set of logic blocks. Furthermore, the breakdown of portions of the system illustrated is not necessarily more or less suitable than a different division of portions of the system in which blocks are combined, subdivided or otherwise differently configured. Service provider database 3000 includes information about a set of service providers and is accessible by the system. Service provider database 3000 may be accessible from a persistent storage medium for example. Service provider display 3110 may access the service provider database 3000 and display information stored therein in a manner suitable for communication to a user of the system. Selection receipt 3120 may receive from such a user a selection of a particular service provider from the service provider database 3120. Connection management 3130 may connect and/or disconnect a user or customer to or from a service provider in a manner described previously. Billing management 3140 may manage billing to or debiting credit from a customer in relation to the customer's connection with a service provider.

In one embodiment, moderation 3150 may perform moderation functions such as selecting which customers may converse or ask a question of a service provider and which customers may be disconnected from the service provider. In an alternate embodiment, moderation 3150 may be an interface between a moderator external to the system (whether automated or not) and may transmit instructions and data from and to the moderator.

Figure 13:
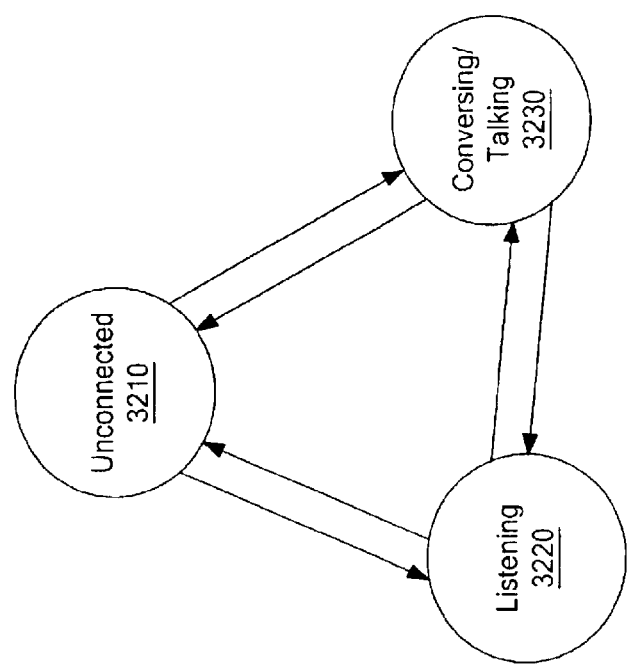
FIG. 13 illustrates an embodiment of the states a customer enters while interacting in a group call.

FIG. 13 illustrates an embodiment of the states a customer enters while interacting in a group call. In disconnected state 3210, the customer is not connected to the group call. From that state, the customer may transition to listening state 3220, in which the customer may listen to the service provider. Likewise, from the disconnected state 3210, the customer may transition to the conversing or talking state 3230 in which the customer may transmit questions or otherwise converse with the service provider. Similarly, transitions between the listening state 3220 and the conversing or talking state 3230 may occur.

In one embodiment, transitions to the listening state 3220 involve initiation or preservation of a link capable of transmitting from the service provider to the customer. Similarly, in one embodiment, transitions to the conversing or talking state 3230 may involve establishment or maintenance of a two-way communications link, while transitions to the disconnected state 3210 may involve severing or disconnecting such links. Alternately, an embodiment may involve two-way links for both the listening state 3220 and the conversing or talking state 3230, and a further alternative may involve inactivating rather than disconnecting a link when in the disconnected state 3210.

As will be appreciated, in some embodiments, state transitions and corresponding changes in connections may be managed by a moderator, and performed by a system or other intermediary which may include the moderator or act in response to the moderator.

The systems and methods have been described above in terms of a "service-marketplace" system in which customers are waiting to receive information services in real-time from a service provider over a communications network. Such a system is described in detail in co-pending U.S. application Ser. No. 09/414,710, which is incorporated herein by reference. When implemented with such systems, the group call functions described above may be performed by the controller computer 300 (see FIG. 1 and FIG. 2), such as performing mediation services or providing communications links. However, it should be noted the systems and methods may be incorporated into other systems in which users communicate with a service provider in a group setting.

EXAMPLE

A nationally renowned scholar of the French language—named Pierre—provides language tutoring through a "service-marketplace" web site. Buyers who are interested in learning French can read about Pierre's background at the web site. They can read what other buyers have said about his language-tutoring services. They can see a price per minute—50 cents—that must be remitted in order to be connected with Pierre. They can also see an icon on the web site that indicates whether Pierre is available to provide his services at this very moment. When Pierre is available to provide services, he calls an 800 number and presses the "1" digit to indicate that his services are now in session. This causes the icon on the web site to indicate to all potential buyers that Pierre is now available.

A buyer named Jeanne is a student of French and has a question about word usage that she would like to ask Pierre. She goes to the web site and sees whether Pierre is available. The icon indicates that he is indeed available. Moreover, he is currently in session with four other students. Jeanne would like to join the conference and therefore clicks on the "Join Now" button. Her telephone rings. She is instantly connected into the conference. She introduces herself and joins the discussion. All five members of the conference can converse with each other in a group session. Jeanne is automatically billed 50 cents per minute for taking part in the conference.

Pierre's French tutoring service soon becomes extremely popular. Students from around the country join the conference, and soon the on-line discussion has more than fifty participants. A group conversation with so many participants becomes unwieldy for Pierre, so he introduces a moderator to control the discussion.

The moderator informs Jeanne and the rest of the participants that not everyone will be able to speak at once. All participants will be able to listen to the conference, but the moderator will control who in the audience will be allowed to speak and ask a question. In fact, asking a question in this conference will cost an additional five dollars.

In order to control the discussion in this way, the moderator uses an interface that indicates a list of the buyers in the conference. The moderator can control whether a buyer has listening privileges or both listening and speaking privileges. The moderator can also remove any buyer from the conference completely.

Jeanne would like to ask her question about word usage, so she clicks on the "Ask a Question" button on the web site.

The moderator grants Jeanne speaking privileges so that she may ask her question of Pierre. The rest of the conference can listen to this discussion. All participants are being charged 50 cents per minute for taking part in the conference. Jeanne is charged an additional five dollars for asking her question.

When Pierre no longer wishes to entertain questions, he informs the participants that he would like to end the conference. He hangs up his phone. He then calls the 800-number to inform the web site that he will no longer be providing services. The icon on the web site now indicates "Not Available," and students are no longer able to connect to Pierre.

At the end of the month, Pierre is sent a check in the mail for all the fees collected by the conferencing system.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 1 may be integrated into components, or may be subdivided into components. Moreover, the blocks of FIG. 7a, for example, represent portions of a method which, in some embodiments, may be reordered or may be organized in parallel rather than in a linear or step-wise fashion. The present specification and Figures are accordingly to be regarded as illustrative rather than restrictive.

What is claimed is:

1. A method comprising:

displaying a service provider and a service provider rate for communicating with the service provider and a real-time indication of whether the service provider is currently providing information;

receiving a request from a first customer to communicate with the service provider;

connecting the first customer to the service provider through a link capable of transmitting from the service provider to the first customer;

receiving a request from a second customer to communicate with the service provider;

connecting the second customer to the service provider through a link capable of transmitting from the service provider to the second customer while the first customer is coupled to the service provider such that any information conveyed to the second customer is conveyed to the first customer;

billing the first customer automatically based on the time during which the link to the first customer is maintained; and billing the second customer automatically based on the time during which the link to the second customer is maintained.

2. The method of claim 1 wherein:

the link from the service provider to the first customer is implemented through use of telephone connections.

3. The method of claim 1 wherein:

the link from the service provider to the first customer is implemented through use of the internet.

4. The method of claim 1 wherein:

the link from the service provider to the first customer is configured to transmit from the first customer to the service provider.

5. The method of claim 1 wherein:

the first customer paying an intermediary and the second customer paying the intermediary, the intermediary receiving the requests, the intermediary connecting the service provider to the first customer, the intermediary connecting the service provider to the second customer, the intermediary performing the billing.

6. The method of claim 5 wherein:

the intermediary having a set of service providers including the service provider; and the intermediary performing the providing in response to a choice by the first customer of the service provider from the set of service providers.

7. The method of claim 6 wherein:

the link from the service provider to the first customer is implemented through use of the internet or through use of telephone connections.

8. The method of claim 6 wherein:

the link from the service provider to the first customer is configured to transmit from the first customer to the service provider.

9. The method of claim 8 further comprising:

moderating transmissions from the service provider and transmissions from the first customer.

10. The method of claim 9 wherein:

the moderating is performed by the service provider.

11. The method of claim 9 wherein:

the moderating is performed by a moderator.

12. The method of claim 11 further comprising:

the moderator receiving a request from the first customer to transmit to the service provider.

13. The method of claim 12 further comprising:

the moderator granting the request from the first customer to transmit to the service provider upon payment by the first customer to the intermediary.

14. The method of claim 12 wherein:

the request from the first customer to transmit to the service provider pertains to conversing with the service provider.

15. The method of claim 14 further comprising:

permitting the first customer to converse with the service provider; and receiving payment from the first customer based on a duration of the conversing.

16. The method of claim 14 further comprising:

receiving a request from the second customer to converse with the service provider.

17. The method of claim 16 further comprising:

the moderator queuing requests to converse with the service provider.

18. The method of claim 15 further comprising:

ending the conversing between the first customer and the service provider.

19. The method of claim 12 wherein:

the request from the first customer to transmit to the service provider pertains to transmitting a question to the service provider.

20. The method of claim 19 further comprising:

permitting the first customer to transmit the question to the service provider; and receiving payment from the first customer for transmitting the question to the service provider.

21. The method of claim 19 further comprising:

receiving a request from the second customer to transmit a question to the service provider.

22. The method of claim 21 further comprising:

the moderator queuing requests to transmit questions to the service provider.

23. The method of claim 12 further comprising:

removing the first customer from the link between the first customer and the service provider, the removing performed by the moderator.

24. A system for connecting a plurality of customers to a service provider comprising:

a first logic unit configured to display a service provider rate for listening to a service provider and to provide a real-time indication of whether the service provider is currently providing information;

a second logic unit coupled to the first logic unit, the second logic unit configured to receive a request from a first customer to communicate with the service provider, the second logic unit further configured to connect the first customer to the service provider through a link capable of transmitting from the service provider to the first customer;

the second logic unit further configured to receive a request from a second customer to communicate with the service provider, and the second logic unit further configured to connect the second customer to the service provider through a link capable of transmitting from the service provider to the second customer while the first customer is connected to the service provider such that any information conveyed to the second customer is conveyed to the first customer; and a third logic unit coupled to the second logic unit, the third logic unit configured to bill the first customer automatically based on the time during which the link to the first customer is maintained, and the third logic unit further configured to bill the second customer automatically based on the time during which the link to the second customer is maintained.

25. The system of claim 24 wherein:

the link from the service provider to the first customer is configured to transmit from the first customer to the service provider.

26. The system of claim 24 wherein:

an intermediary including the first logic unit, the second logic unit and the third logic unit, the first customer paying the intermediary and the second customer paying the intermediary.

27. The system of claim 26 wherein:

the intermediary having a set of service providers including the service provider, the set of service providers accessible by the first logic unit; and the first logic unit configured to receive a choice by the first customer of the service provider from the set of service providers, the first logic unit configured to display the service provider in response to the choice.

28. The system of claim 27 wherein:

the link from the service provider to the first customer is implemented through use of the internet or through use of telephone connections.

29. The system of claim 27 wherein:

the link from the service provider to the first customer is configured to transmit from the first customer to the service provider.

30. The system of claim 29 further comprising:
a fourth logic unit coupled to the second logic unit, the fourth logic unit configured to moderate transmissions from the service provider and transmissions from the first customer.

31. The system of claim 30 wherein:
the fourth logic unit is controlled by the service provider.

32. The system of claim 30 wherein:
the fourth logic unit is controlled by a moderator.

33. The system of claim 32 wherein:
the fourth logic unit is configured to receive a request from the first customer to transmit to the service provider.

34. The system of claim 33 wherein:
the fourth logic unit is configured to receive a grant of the request from the first customer to transmit to the service provider upon payment by the first customer to the intermediary, the fourth logic unit is configured to permit transmission from the first customer to the service provider upon receipt of the grant.

35. The system of claim 33 wherein:
the request from the first customer to transmit to the service provider pertains to conversing with the service provider.

36. The system of claim 35 wherein:
the fourth logic unit is configured to permit the first customer to converse with the service provider; and
the intermediary is configured to receive payment from the first customer based on a duration of the conversing.

37. The system of claim 35 wherein:
the fourth logic unit is configured to receive a request from the second customer to converse with the service provider.

38. The system of claim 37 wherein:
the fourth logic unit is configured to maintain a queue of requests to converse with the service provider, the fourth logic unit is configured to adjust the queue of requests responsive to the moderator.

39. The system of claim 36 wherein:
the fourth logic unit is further configured to end the conversing between the first customer and the service provider.

40. The system of claim 33 wherein:
the request from the first customer to transmit to the service provider pertains to transmitting a question to the service provider.

41. The system of claim 40 wherein:
the fourth logic unit is configured to permit the first customer to transmit the question to the service provider; and
the intermediary is configured to receive payment from the first customer in exchange for transmitting the question to the service provider.

42. The system of claim 40 wherein:
the fourth logic unit is configured to receive a request from the second customer to transmit a question to the service provider.

43. The system of claim 42 wherein:
the fourth logic unit is configured to maintain a queue of requests to converse with the service provider, the fourth logic unit is configured to adjust the queue of requests responsive to the moderator.

44. The system of claim 33 wherein:
the fourth logic unit further is configured to remove the first customer from the link between the first customer and the service provider, the fourth logic unit is configured to remove the first customer from the link responsive to the moderator.

45. The system of claim 24 wherein:
the link from the service provider to the first customer is implemented through use of the internet.

46. The system of claim 24 wherein:
the link from the service provider to the first customer is implemented through use of telephone lines.

47. A machine-readable medium embodying instructions, the instructions for execution by a processor, execution of the instructions by the processor causing the processor to perform a method comprising:
displaying a service provider and a service provider rate for listening to the service provider and a real-time indication of whether the service provider is currently providing information;
receiving a request from a first customer to communicate with the service provider;
connecting the first customer to the service provider through a link capable of transmitting from the service provider to the first customer;
receiving a request from a second customer to communicate with the service provider;
connecting the second customer to the service provider through a link capable of transmitting from the service provider to the second customer while the first customer is connected to the service provider such that any information conveyed to the second customer is conveyed to the first customer,
billing the first customer automatically based on the time during which the link to the first customer is maintained; and
billing the second customer automatically based on the time during which the link to the second customer is maintained.

48. The machine-readable medium of claim 47 further embodying instructions, the instructions causing the processor to perform the method wherein:
the first customer paying an intermediary and the second customer paying the intermediary, the intermediary receiving the requests, the intermediary connecting the service provider to the first customer, the intermediary connecting the service provider to the second customer, the intermediary performing the billing.

49. The machine-readable medium of claim 48 further embodying instructions, the instructions causing the processor to perform the method wherein:
the intermediary having a set of service providers including the service provider; and
the intermediary performing the displaying in response to a choice by the first customer of the service provider from the set of service providers.

50. The machine-readable medium of claim 49 further embodying instructions, the instructions causing the processor to perform the method wherein:
the link from the service provider to the first customer is implemented through use of the internet or through use of telephone connections.

51. The machine-readable medium method of claim 49 wherein:
the link from the service provider to the first customer is configured to transmit from the first customer to the service provider.

52. The machine-readable medium of claim 51 further embodying instructions, the instructions causing the processor to perform the method further comprising:

moderating transmissions from the service provider and transmissions from the first customer.

53. The machine-readable medium of claim 52 further embodying instructions, the instructions causing the processor to perform the method wherein:

the moderating is performed by the service provider.

54. The machine-readable medium of claim 52 further embodying instructions, the instructions causing the processor to perform the method wherein:

the moderating is performed by a moderator.

55. The machine-readable medium of claim 54 further embodying instructions, the instructions causing the processor to perform the method further comprising:

the moderator receiving a request from the first customer to transmit to the service provider.

56. The machine-readable medium of claim 55 further embodying instructions, the instructions causing the processor to perform the method further comprising:

the moderator granting the request from the first customer to transmit to the service provider upon payment by the first customer to the intermediary.

57. The machine-readable medium of claim 55 further embodying instructions, the instructions causing the processor to perform the method further comprising:

receiving a request from the second customer to transmit to the service provider.

58. The machine-readable medium of claim 57 further embodying instructions, the instructions causing the processor to perform the method further comprising:

the moderator queuing requests to transmit to the service provider.

59. The machine-readable medium of claim 56 further embodying instructions, the instructions causing the processor to perform the method further comprising:

ending the transmitting from the first customer to the service provider.

60. The machine-readable medium of claim 54 further embodying instructions, the instructions causing the processor to perform the method further comprising:

removing the first customer from the link between the first customer and the service provider, the removing performed by the moderator.

61. A system comprising:

means for displaying a service provider and a service provider rate for listening to the service provider and a real-time indication of whether the service provider is currently providing information;

means for receiving a request from a first customer to communicate with the service provider;

means for connecting the first customer to the service provider through a link capable of transmitting from the service provider to the first customer;

means for receiving a request from a second customer to communicate with the service provider;

means for connecting the second customer to the service provider through a link capable of transmitting from the service provider to the second customer while the first customer is connected to the service provider such that any information conveyed to the second customer is conveyed to the first customer;

means for billing the first customer automatically based on the time during which the link to the first customer is maintained; and means for billing the second customer automatically based on the time during which the link to the second customer is maintained.

62. The system of claim 61 wherein:

the link from the service provider to the first customer is configured to transmit from the first customer to the service provider.

63. The system of claim 62 wherein:

the means for displaying having a set of service providers including the service provider; and the means for displaying performing the displaying in response to a choice by the first customer of the service provider from the set of service providers.

64. The system of claim 63 wherein:

the link from the service provider to the first customer is implemented through use of the internet or through use of telephone connections.

65. The system of claim 63 wherein:

the link from the service provider to the first customer is configured to transmit from the first customer to the service provider.

66. The system of claim 63 further comprising:

means for moderating transmissions from the service provider and transmissions from the first customer.

67. The system of claim 66 wherein:

the means for moderating is configured to perform responsive to the service provider.

68. The system of claim 66 wherein:

the means for moderating is configured to perform responsive to a moderator.

69. The system of claim 68 wherein:

the means for moderating is configured to receive a request from the first customer to transmit to the service provider.

70. The system of claim 69 wherein:

the moderator granting the request from the first customer to transmit to the service provider, the means for moderating permitting the first customer to transmit to the service provider responsive to the moderator granting the request.

71. The system of claim 70 wherein:

the means for moderating is configured to receive a request from the second customer to transmit to the service provider.

72. The system of claim 71 wherein:

the means for moderating is configured to queue requests to transmit to the service provider.

73. The system of claim 70 wherein:

the means for moderating is configured to end the conversing between the first customer and the service provider responsive to the moderator.

74. The system of claim 68 wherein:

the means for moderating is configured to remove the first customer from the link between the first customer and the service provider, the removing performed responsive to the moderator.

75. A system for connecting a plurality of customers to a service provider comprising:

a communications interface;

a controller computer coupled to the communications interface having:

a first logic unit configured to display a service provider rate for listening to a service provider and to provide a real-time indication of whether the service provider is available currently providing information;

a second logic unit coupled to the first logic unit, the second logic unit configured to receive a request from a first customer to communicate with the service provider, the second logic unit further configured to connect the first customer to the service provider through a link capable of transmitting from the service provider to the first customer;

the second logic unit further configured to receive a request from a second customer to communicate with the service provider, and the second logic unit further configured to connect the second customer to the service provider through a link capable of transmitting from the service provider to the second customer while the first customer is connected to the service provider such that any information conveyed to the second customer is conveyed to the first customer; and a third logic unit coupled to the second logic unit, the third logic unit configured to bill the first customer automatically based on the time during which the link to the first customer is maintained, and the third logic unit further configured to bill the second customer automatically based on the time during which the link to the second customer is maintained.

76. The system of claim 75 wherein:

the link from the service provider to the first customer is configured to transmit from the first customer to the service provider.

77. The system of claim 76 wherein:

the system having a set of service providers including the service provider, the set of service providers accessible by the first logic unit; and the first logic unit is configured to receive a choice by the first customer of the service provider from the set of service providers, the first logic unit is configured to display the service provider in response to the choice.

78. The system of claim 77 wherein:

the link from the service provider to the first customer is implemented through use of the internet or through use of telephone connections.

79. The system of claim 77 wherein:

the link from the service provider to the first customer configured to transmit from the first customer to the service provider.

80. The system of claim 79 wherein:

the controller computer further having a fourth logic unit coupled to the second logic unit, the fourth logic unit configured to moderate transmissions from the service provider and transmissions from the first customer.

81. The system of claim 80 wherein:

the fourth logic unit is controlled by the service provider.

82. The system of claim 80 wherein:

the fourth logic unit is controlled by a moderator.

83. The system of claim 82 wherein:

the fourth logic unit is configured to receive a request from the first customer to transmit to the service provider.

84. The system of claim 83 wherein:

the fourth logic unit is configured to receive a grant of the request from the first customer to transmit to the service provider upon payment by the first customer to the system, the fourth logic unit is configured to permit transmission from the first customer to the service provider upon receipt of the grant.

85. The system of claim 83 wherein:

the request from the first customer to transmit to the service provider pertains to conversing with the service provider.

86. The system of claim 85 wherein:

the fourth logic unit is configured to permit the first customer to converse with the service provider; and the system is configured to receive payment from the first customer based on a duration of the conversing.

87. The system of claim 85 wherein:

the fourth logic unit is configured to receive a request from the second customer to converse with the service provider.

88. The system of claim 87 wherein:

the fourth logic unit is configured to maintain a queue of requests to converse with the service provider, the fourth logic unit is configured to adjust the queue of requests responsive to the moderator.

89. The system of claim 86 wherein:

the fourth logic unit is further configured to end the conversing between the first customer and the service provider.

90. The system of claim 83 wherein:

the request from the first customer to transmit to the service provider pertains to transmitting a question to the service provider.

91. The system of claim 90 wherein:

the fourth logic unit is configured to permit the first customer to transmit the question to the service provider; and the system is configured to receive payment from the first customer in exchange for transmitting the question to the service provider.

92. The system of claim 90 wherein:

the fourth logic unit is configured to receive a request from the second customer to transmit a question to the service provider.

93. The system of claim 92 wherein:

the fourth logic unit is configured to maintain a queue of requests to converse with the service provider, the fourth logic unit is configured to adjust the queue of requests responsive to the moderator.

94. The system of claim 83 wherein:

the fourth logic unit is further configured to remove the first customer from the link between the first customer and the service provider, the fourth logic unit is configured to remove the first customer from the link responsive to the moderator.

95. The system of claim 75 wherein:

the link from the service provider to the first customer is implemented through use of the internet.

96. The system of claim 75 wherein:

the link from the service provider to the first customer is implemented through use of telephone lines.

* * * * *